P. B. CUNNINGHAM.
Vehicle Fifth Wheel.

No. 166,854. Patented Aug. 17, 1875.

Witnesses,
Harry Smith
Hubert Howson

P. B. Cunningham
by his Attorneys,
Howson and Son

UNITED STATES PATENT OFFICE

PETER B. CUNNINGHAM, OF FREEHOLD, PENNSYLVANIA.

IMPROVEMENT IN VEHICLE FIFTH-WHEELS.

Specification forming part of Letters Patent No. 166,854, dated August 17, 1875; application filed May 17, 1875.

*To all whom it may concern:*

Be it known that I, PETER B. CUNNINGHAM, of Freehold, Luzerne county, Pennsylvania, have invented certain Improvements in Vehicles, of which the following is a specification:

The object of my invention is to so construct the fifth-wheel of a vehicle that the operation of turning the front wheels under the body will be facilitated, and the accidental movement of the same prevented; and this object I attain in the manner which I will now proceed to describe, reference being had to the accompanying drawing, in which—

Figure 1:
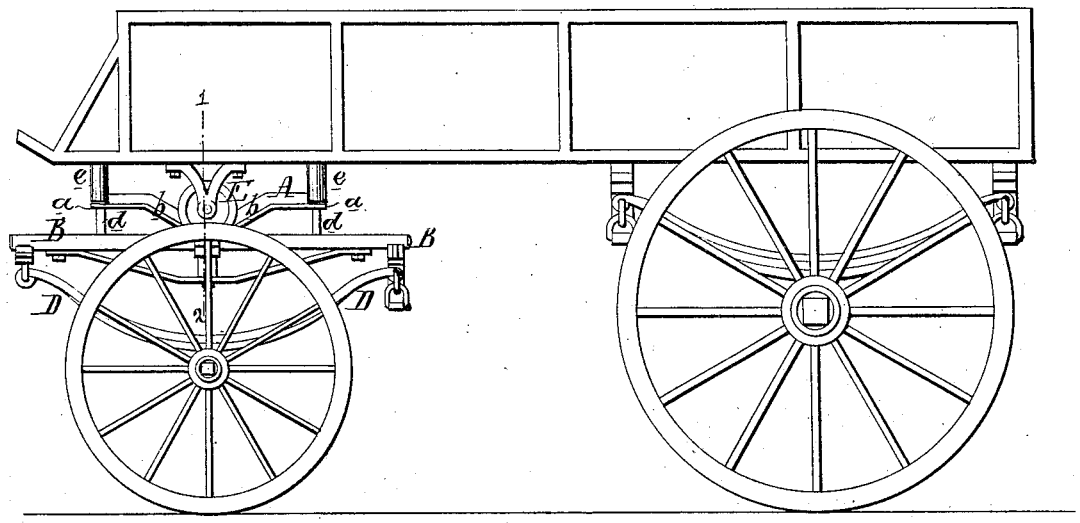
Figure 2:
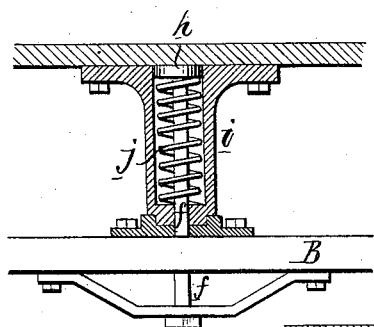
Figure 4:
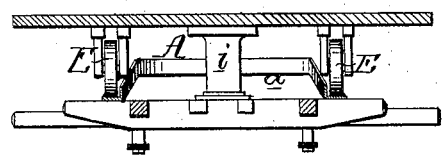
Figure 3:
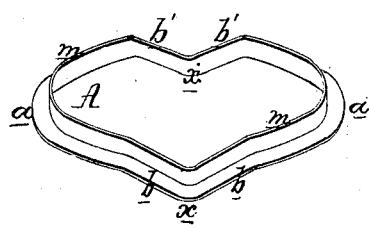

Figure 1 is a side view of a wagon, showing the application of my improved fifth-wheel; Fig. 2, a vertical sectional view of the king-bolt and its socket; Fig. 3, a perspective view of the fifth-wheel detached from the frame of the wagon; and Fig. 4, a vertical section of the fifth-wheel on the line 1 2, Fig. 1.

The ordinary fifth-wheel of a vehicle consists of a simple flat ring of iron secured to a frame attached to the axle of the front wheels, and a similar ring secured to the body of the vehicle. In fifth-wheels of this character, the friction accompanying the turning of the front wheels under the body is excessive, and the main object of my invention is to overcome this defect—an object which I accomplish by constructing the fifth-wheel and its connections in the manner shown in the drawing.

A represents the fifth-wheel, which is circular, as usual; but its face, instead of being wholly flat, has raised portions $a\ a$ and inclined portions $b\ b$ and $b'\ b'$. The fifth-wheel is secured to a frame, B, of the usual construction, which rests upon the springs D, secured to the axle of the front wheels. The body of the vehicle rests upon the fifth-wheel through the medium of two rollers, E, one at each side, these rollers turning in brackets secured to the bottom of the wagon, and resting, when the front wheels are in line with the body of the wagon, at the point $x$, where the inclined portions of the fifth-wheel meet. The raised portions of the fifth-wheel are supported by blocks $d$, inserted between said raised portions and the frame B, and similar blocks, $e$, are secured to the bottom of the vehicle, and rest loosely upon the upper surface of said raised portions, so that when the vehicle is loaded these blocks will bear on the surfaces $a\ a$, and will prevent the entire weight of the load from coming on the rollers E and the king-bolt. This king-bolt forms another feature of my invention, and is illustrated in Fig. 2. The bolt proper consists of a stem, $f$, passing through the central strip of the frame B, secured to a brace below the same, and provided at the top with an enlarged head, $h$. The upper portion of the bolt slides in a tubular socket, $i$, the upper end of which is secured to the bottom of the vehicle, the lower end resting on a plate secured to the frame B. Between the enlarged head $h$ of the bolt $f$ and the closed lower end of the socket $i$ intervenes a spiral spring, $j$, the tendency of which is to elevate the said bolt, so that when the wheels E commence to rise on the inclined portions of the fifth-wheel A, the body of the vehicle and socket $i$ consequently rising, the spring will ease this upward movement, and prevent the sudden shocks which might otherwise occur. The fifth-wheel A has a flange, M, around its inner edge, the object of which is partly to keep the rollers E in place, and partly to strengthen the ring, so that it can be made of lighter metal than is usually employed.

The wheels E may, if desired, be coated with rubber to prevent rattling, and the lower ends of the blocks $i'$ and king-bolt socket $i$ may be provided with anti-friction rollers to lessen the wear of these parts.

It will be evident that by constructing the fifth-wheel of a vehicle as above described, so that a little force has to be exerted before the front wheels can commence to turn in under the body, the accidental turning of the same can be prevented, while the rollers E will facilitate the movement after it is once commenced by turning the tongue of the vehicle in the proper manner.

The angle of the inclined portions of the fifth-wheel may be varied in accordance with the character of the vehicle to which my invention is applied, the angle being reduced as the weight of the wagon increases.

I claim as my invention—

1. The combination of the fifth-wheel A, secured to the frame B, and provided with raised flat portions $a$ $a$ and inclined portions $b$ $b$ and $b'$ $b'$, with the rollers E, hung to the under side of the wagon-body, all as and for the purpose set forth.

2. The king-bolt $f$, secured to the frame B, and having an enlarged head, $h$, in combination with the tubular socket $i$ and its spring $j$.

3. The combination of the raised flat portions $a$ $a$ of the fifth-wheel A with the blocks $e$, secured to the under side of the body, as and for the purpose set forth.

In testimony whereof I have signed my name to this specification in the presence of two subscribing witnesses.

PETER B. CUNNINGHAM.

Witnesses:
HUBERT HOWSON,
HARRY SMITH.